(12) United States Patent
Vasseur et al.

(10) Patent No.: US 7,814,227 B2
(45) Date of Patent: Oct. 12, 2010

(54) COMPUTATION OF A SHORTEST INTER-DOMAIN TE-LSP ACROSS A SET OF AUTONOMOUS SYSTEMS

(75) Inventors: Jean-Philippe Vasseur, Dunstable, MA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 11/073,348

(22) Filed: Mar. 4, 2005

(65) Prior Publication Data

US 2006/0200579 A1 Sep. 7, 2006

(51) Int. Cl.
*G06F 15/173* (2006.01)
(52) U.S. Cl. ...................................... 709/241; 370/238
(58) Field of Classification Search ................ 709/238, 709/241, 242, 244, 243; 710/316; 370/238
See application file for complete search history.

(56) References Cited

U.S. PATENT DOCUMENTS

| | | | |
|---|---|---|---|
| 5,519,704 A | | 5/1996 | Farinacci et al. |
| 5,600,638 A | * | 2/1997 | Bertin et al. ................ 370/351 |
| 6,256,309 B1 | | 7/2001 | Daley et al. |
| 6,370,119 B1 | | 4/2002 | Basso et al. |
| 6,473,421 B1 | | 10/2002 | Tappan |
| 6,542,469 B1 | * | 4/2003 | Kelley et al. ................ 370/238 |
| 6,553,423 B1 | | 4/2003 | Chen |
| 6,600,724 B1 | | 7/2003 | Cheng |
| 6,603,756 B1 | | 8/2003 | Tappan |
| 6,765,880 B1 | | 7/2004 | Hillard et al. |
| 6,982,975 B1 | * | 1/2006 | Aramaki et al. ............. 370/388 |
| 6,993,593 B2 | * | 1/2006 | Iwata ......................... 709/238 |
| 7,319,700 B1 | * | 1/2008 | Kompella ................... 370/227 |
| 2002/0145981 A1 | * | 10/2002 | Klinker et al. .............. 370/244 |
| 2003/0021232 A1 | * | 1/2003 | Duplaix et al. .............. 370/238 |
| 2004/0081154 A1 | | 4/2004 | Kouvelas |
| 2004/0090913 A1 | | 5/2004 | Scudder et al. |

(Continued)

FOREIGN PATENT DOCUMENTS

EP 06 73 6187.3 3/2009

(Continued)

OTHER PUBLICATIONS

Vasseur, et al. "RSVP Path computation reuest and reply messages" draft-vasseur-mpls-computation-rsvp-Jun. 3, 2002, IETF Internet Draft.*

(Continued)

*Primary Examiner*—Jungwon Chang
(74) *Attorney, Agent, or Firm*—Cesari and McKenna, LLP

(57) ABSTRACT

A technique calculates a shortest path for a traffic engineering (TE) label switched path (LSP) from a head-end node in a local domain to a tail-end node of a remote domain in a computer network. The novel path calculation technique determines a set of different remote domains through which the TE-LSP may traverse to reach the tail-end node (e.g., along "domain routes"). Once the set of possible routes is determined, the head-end node sends a path computation request to one or more path computation elements (PCEs) of its local domain requesting a computed path for each domain route. Upon receiving path responses for each possible domain route, the head-end node selects the optimal (shortest) path, and establishes the TE-LSP accordingly.

32 Claims, 7 Drawing Sheets

U.S. PATENT DOCUMENTS

2004/0148150 A1* 7/2004 Ashar et al. .................. 703/14
2004/0196827 A1   10/2004 Xu et al.
2006/0209716 A1*  9/2006 Previdi et al. ............... 370/254

OTHER PUBLICATIONS

Vasseur et al., U.S. Appl. No. 10/767,574, filed Sep. 18, 2003 entitled Computing Inter-Autonomous Systems MPLS Traffic Engineering LSP Paths.
Vasseur et al., U.S. Appl. No. 10/983,280, filed Nov. 5, 2004 entitled Technique for Selecting a Path Computation Element.
Vasseur et al., U.S. Appl. No. 11/049,587, filed Feb. 2, 2005 entitled Inter-Domain Path Computation Technique.
Walton, Daniel., et al., Network Working Group Internet Draft entitled Advertisement of Multiple Paths in BGP (draft-walton-bgp-add-paths-01.txt), Nov. 2002, pp. 1-11.
Vasseur, J. P., et al., Network Working Group Internet Draft, entitled RSVP Path Computation Request and Reply Messages (draft-vasseur-mpls-computation-rsvp-05.txt), Jul. 2004, pp. 1-31.
Vasseur, J. P. et al., OSPF Work Working Group Internet Draft, entitled OSPF MPLS Traffic Engineering Capabilities (draft -vasseur-ospf-te-caps-00.txt), Jul. 2004, pp. 1-14.
Callon, R., RFC 1195, entitled Use of OSI ISIS for routing in TCP/IP and Dual Environments, Dec. 1990, pp. 1-80.
Rekhter, Y., RFC 1771, entitled A Border Gateway Protocol 4 (BGP-4), Mar. 1995, pp. 1-28.
Braden, R. et al., RFC 2205, entitled Resource ReSerVation Protocol (RSVP), Version 1 Functional Specification, Sep. 1997, pp. 1-112.
Moy, J., RFC 2328; entitled OSPF Version 2, Apr. 1998, pp. 1-183.
Awduche, D. et al., RFC 3209, entitled RSVP-TE: Extensions to RSVP for LSP Tunnels Dec. 2001, pp. 1-43.
Berger, L., RFC 3473, entitled Generalized Multi-Protocol Label Switching (GMPLS) Signaling Resource ReserVation Protocol—Traffic Engineering (RSVP-TE) Extensions, Jan. 2003, pp. 1-40.
Katz, D. et al., RFC 3630, entitled Traffic Engineering (TE) Extensions to OSPF Version 2, Sep. 2003, pp. 1-14.
Smit, H., RFC 3784, entitled Intermediate-System-to-Intermediate-System (IS-IS) Extensions for Traffic Engineering (TE), Jun. 2004, pp. 1-13.
Mannie, E., RFC 3945, entitled Generalized Multi-Protocol Label Switching (GMPLS) Architecture, Oct. 2004, pp. 1-65.
Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.
Perlman, Radia, Interconnections Second Edition: Bridges, Routers, Switches, and Internetworking Protocols, Addison Wesley, 1999, Section 12.2.4, pp. 317-319.
Notification of Transmittal of the International Search Report and the Written Opinion of the International Searching Authority, or the Declaration, International Application No. PCT/US06/06811, International Filing Date: Feb. 27, 2006, Date of Mailing: Apr. 3, 2007, 12 pages
Dachille, A., et al., "Diverse Inter-Region Path Setup / Establishment (draft-dachille-diverse-inter-region-path-setup-01.txt)", IEFT, CCamp Working Group Internet Draft, Oct. 1, 2004, 28 pages.
Adrian, F., et al., "A Framework for Inter-Domain MPLS Traffic Engineering (draft-ietf-ccamp-inter-domain-framework-01.txt)", IEFT, Network Working Group Internet Draft, Feb. 1, 2005, 20 pages.

* cited by examiner

NLRI ENTRY 500

| FLAGS 562 |
| IDENTIFIER 564 |
| LENGTH 566 |
| PREFIX 568 | ns
COMPUTATION OF A SHORTEST INTER-DOMAIN TE-LSP ACROSS A SET OF AUTONOMOUS SYSTEMS

BACKGROUND OF THE INVENTION

1. Field of the Invention

The present invention relates to computer networks and more particularly to calculating a shortest path for Traffic Engineering (TE) label switched paths (LSPs) across autonomous systems of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS is generally referred to as a "domain," and a router that interconnects different domains is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers (BGP speakers or BGP nodes) typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995, the contents of which are hereby incorporated in its entirety.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date interdomain routing information, the intermediate network node may cooperate with other intermediate nodes to disseminate routing information representative of the current network topology. Typically, routing information is disseminated among interconnected intermediate network BGP nodes through advertising BGP update messages, or "BGP advertisements." As used herein, a BGP advertisement generally describes any message used by a BGP routing protocol for communicating routing information among interconnected BGP nodes, i.e., routers and switches. Operationally, a remote BGP node (e.g., of a remote domain) may establish a BGP session with a local BGP node (e.g., of a local domain), and transmit a generated BGP advertisement to the local BGP node. Thereafter, the local BGP node may receive the transmitted BGP advertisement and update its routing table based on routing information contained in the received BGP advertisement. Notably, a BGP session between a local and remote domain (interdomain) is an external BGP (eBGP) session. The local BGP node may then transmit the received BGP advertisement to other BGP nodes of the local domain until each interconnected BGP node of the local domain has received the BGP advertisement and updated its local routing table. Notably, a BGP session within a domain (intradomain) is an internal BGP (iBGP) session. BGP nodes within a domain, such as an AS, are typically connected via a fully meshed iBGP session arrangement to ensure that all BGP nodes receive advertisements from the other BGP nodes in the AS. Notably, eBGP and iBGP are generally referred to herein as "BGP."

In practice, each BGP node typically generates and disseminates a BGP advertisement whose routing information includes, inter alia, the set of domains (ASes) that must be traversed in order to reach certain destination address prefixes in remote domains. Particularly, the set of domains is generally transmitted as either an ordered or an unordered set of ASes within the BGP advertisement. When a BGP node advertises a prefix within its domain, the originating BGP node inserts an identification of the remote domain (an AS number) into the BGP advertisement. Prior to forwarding the BGP advertisement, a BGP node of each subsequent domain adds its AS number to the set of domains that must be traversed. In this way, each BGP node that receives a BGP advertisement for certain destination address prefixes learns the set of domains that must be traversed to reach the prefix in the origin domain, or the "domain route" to the prefix. Notably, when a BGP node receives advertisements from multiple domains that describe different domain routes to the same destination, the node chooses a single best domain route for reaching that destination (prefix). Once chosen, the node uses BGP to propagate that best domain route to its neighbors. The decision is based on the value of attributes, such as the number of domains to traverse, contained in a BGP advertisement and other BGP-configurable factors (e.g., policy).

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled OSPF Version 2, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

Link-state protocols are generally used to disseminate intradomain routing information representative of the current network topology of a particular domain (e.g., the local domain). For example, suppose the intermediate network node (IGP node) detects that one of its neighboring nodes (i.e., adjacent network nodes) becomes unavailable, e.g., due to a link failure or the neighboring node going "off-line," etc. In this situation, the IGP node can update the routing information stored in its routing table to ensure that data packets are not routed to the unavailable network node. Furthermore, the IGP node also may communicate this change in network topology to the other IGP nodes so they, too, can update their local routing tables and bypass the unavailable node. In this manner, each of the IGP nodes becomes "aware" of the change in topology.

In practice, each IGP node typically generates and disseminates ("floods") IGP advertisements to neighboring IGP nodes (e.g., of the local domain) in accordance with a predetermined network communication protocol, such as a link-state protocol (e.g., IS-IS, or OSPF). Conventional link-state protocols use link-state advertisements or link-state packets as the IGP advertisements, in which the routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

IGP advertisements are usually flooded until each intermediate network IGP node has received an IGP advertisement from each of the other interconnected intermediate nodes. Notably, a BGP node may also be configured as an IGP node, such that certain information received via BGP advertisements (e.g., prefixes in remote domains) may be forwarded to IGP nodes in accordance with IGP advertisements. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such an SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of its surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). An example of such a distributed PCE architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., Resource ReSerVation Protocol (RSVP), RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Because a BGP node may advertise the best domain route based on certain attributes, such as the number of domains to traverse to the destination or policy, PCE-based path computation techniques for TE-LSPs across multiple domains are generally limited to traversing the "best" domain route based on BGP standards. Consequently, path computation techniques currently rely on the assumption of tree-based domain structures (one known domain route for each destination prefix) or a manually configured set of domains to traverse (e.g., by an administrator with knowledge of desired domain routes). However, in certain circumstance, the "best" path for a given TE-LSP from a source to a destination, e.g., based on different cost metrics, may be through a different domain route than that advertised through BGP. There remains a need, therefore, for a technique that efficiently determines the set of domain routes to the tail-end node of a TE-LSP, and generates path computation requests for each possible domain route in order to select the shortest path from a source to a destination based on TE-LSP metrics.

SUMMARY OF THE INVENTION

The present invention is directed to a technique for calculating a shortest path for a traffic engineering (TE) label switched path (LSP) from a head-end node in a local domain to a tail-end node of a remote domain in a computer network. The novel path calculation technique determines a set of different remote domains through which the TE-LSP may traverse to reach the tail-end node (e.g., along "domain routes"). Once the set of possible routes is determined, the head-end node sends a path computation request to one or more path computation elements (PCEs) of its local domain requesting a computed path for each domain route. Upon receiving path responses for each possible domain route, the head-end node selects the optimal (shortest) path, and establishes the TE-LSP accordingly.

In the illustrative embodiment described herein, the domain routes are determined using extensions to Border Gateway Protocol (BGP) messages. BGP nodes of the remote domains propagate ("advertise") domain routes to various prefixes, e.g., to the prefix containing the tail-end node, by means of BGP messages ("BGP advertisements") transmitted across domains to a local BGP node. The extensions allow the BGP advertisements to advertise all possible domain routes, in addition to the best domain route advertised by the advertising BGP node.

In accordance with one aspect of the present invention, the head-end node receives the BGP advertisements containing the possible domain routes, and determines the set of domain routes that lead to the tail-end node (e.g., to the prefix of the tail-end node). Notably, the head-end node may exclude domain routes based on policy, and may also exclude domain routes if they are a superset of other domain routes (i.e., include all the domains of some other domain route, in addition to one or more other domains). The head-end node generates a path computation request for each of the remaining domain routes, and sends the requests to the appropriate PCE (i.e., a PCE that handles requests for the particular domain route).

In the illustrative embodiment described herein, the path computation requests are transmitted in accordance with Resource ReSerVation Protocol (RSVP) TE signaling messages. The head-end node inserts the domain route information into the path computation request, as discovered by the BGP advertisements, and transmits the request to the appropriate PCE. Notably, the path computation requests include type/length/value (TLV) encoded formats used to convey the domain route information. The PCE(s) then computes a shortest path for each domain route based on the information in the request, regardless of the domain route typically used for path computation by the PCE.

In accordance with another aspect of the present invention, the head-end node receives responses to the path computation requests, where each response contains the shortest path for the corresponding domain route, e.g., based on some metric, or "cost." The head-end node then selects the shortest path to the tail-end node, and establishes the TE-LSP accordingly. Notably, the head-end node may be configured to receive responses for a period of time before selecting the shortest path. Also, paths resulting from other domain routes that are not selected may be stored for use as backup paths or other uses.

Advantageously, the novel technique calculates a shortest path for a TE-LSP from a head-end node in a local domain to a tail-end node of a remote domain in a computer network. By determining the set of domain routes to the tail-end node, the inventive technique provides an efficient mechanism for generating path computation requests for each possible domain route, and selecting the shortest path contained in responses to the request. In particular, the invention provides the shortest path through a selection of multiple domain routes, not just through the conventional domain route, which may or may not be the optimal route.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
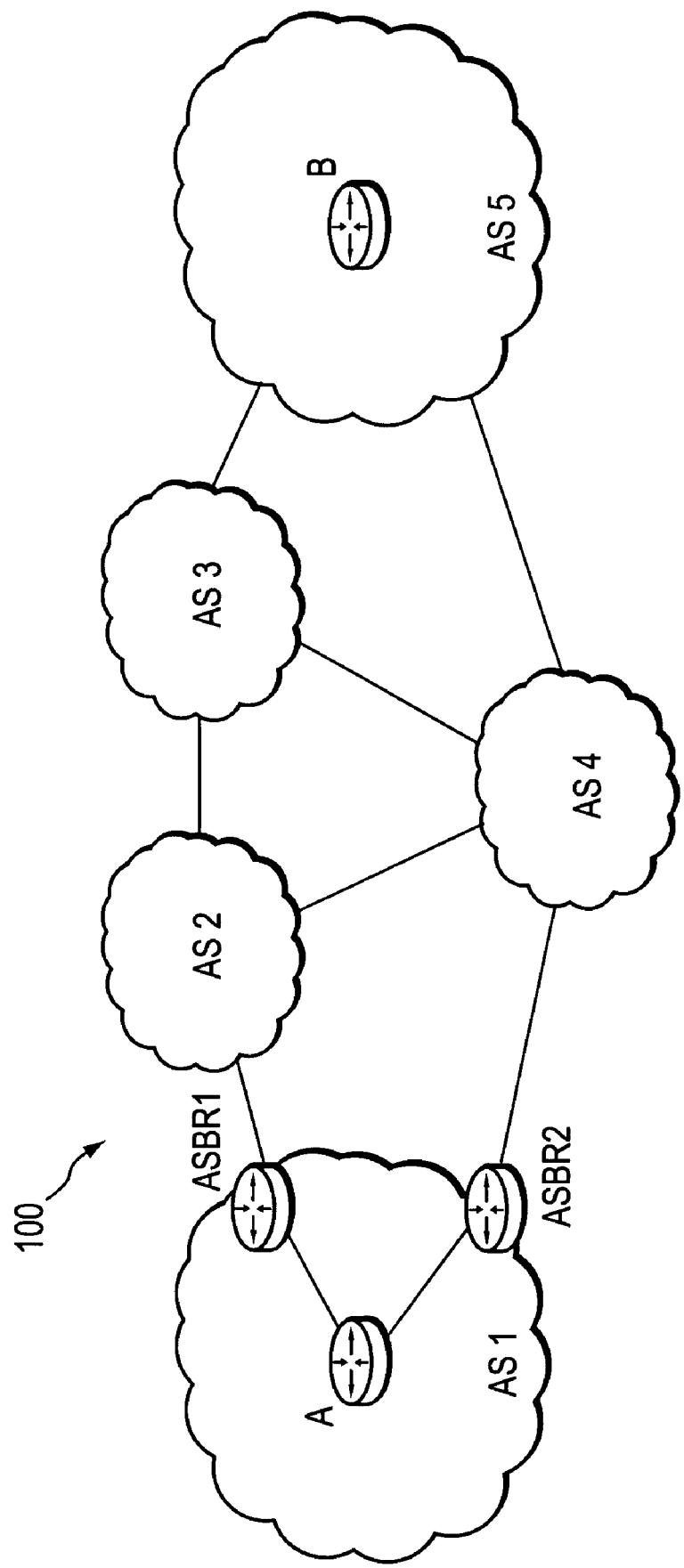
FIG. 1 is a schematic block diagram of an exemplary computer network of autonomous systems that may be used in accordance with the present invention.

FIG. 1 is a schematic block diagram of an exemplary computer network 100 comprising autonomous systems AS1 and AS5 interconnected by autonomous systems AS2, AS3, and AS4, as shown. An Autonomous System (AS) is herein defined to be a group of intermediate nodes, such as intradomain routers, within a network that are subject to a common authority and execute one or more intradomain routing protocols. Although each AS is illustratively an autonomous system, those skilled in the art will appreciate that the ASes may alternatively be configured as routing domains or other networks or subnetworks. The autonomous system AS1 includes intradomain routers, such as AS border routers ASBR1 and ASBR2, through which communication, such as data packets, may pass into and out of the AS to other AS border routers (not shown) for ASes AS2 and AS4. Moreover, within AS 1 and AS5, there are exemplary intradomain routers A and B, respectively. Those skilled in the art will understand that any number of routers may be used in the ASes, and that any number of ASes may be contained within the network 100 interconnected in various other configurations. These examples are merely representative, and the view shown herein is for simplicity.

Data packets may be exchanged among the autonomous systems AS1-AS5 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements or link-state packets. In addition, data packets containing network routing information may be exchanged among the autonomous systems AS1-AS5 using "external" gateway protocols, such as the Border Gateway Protocol (BGP), as described further herein.

Figure 2:
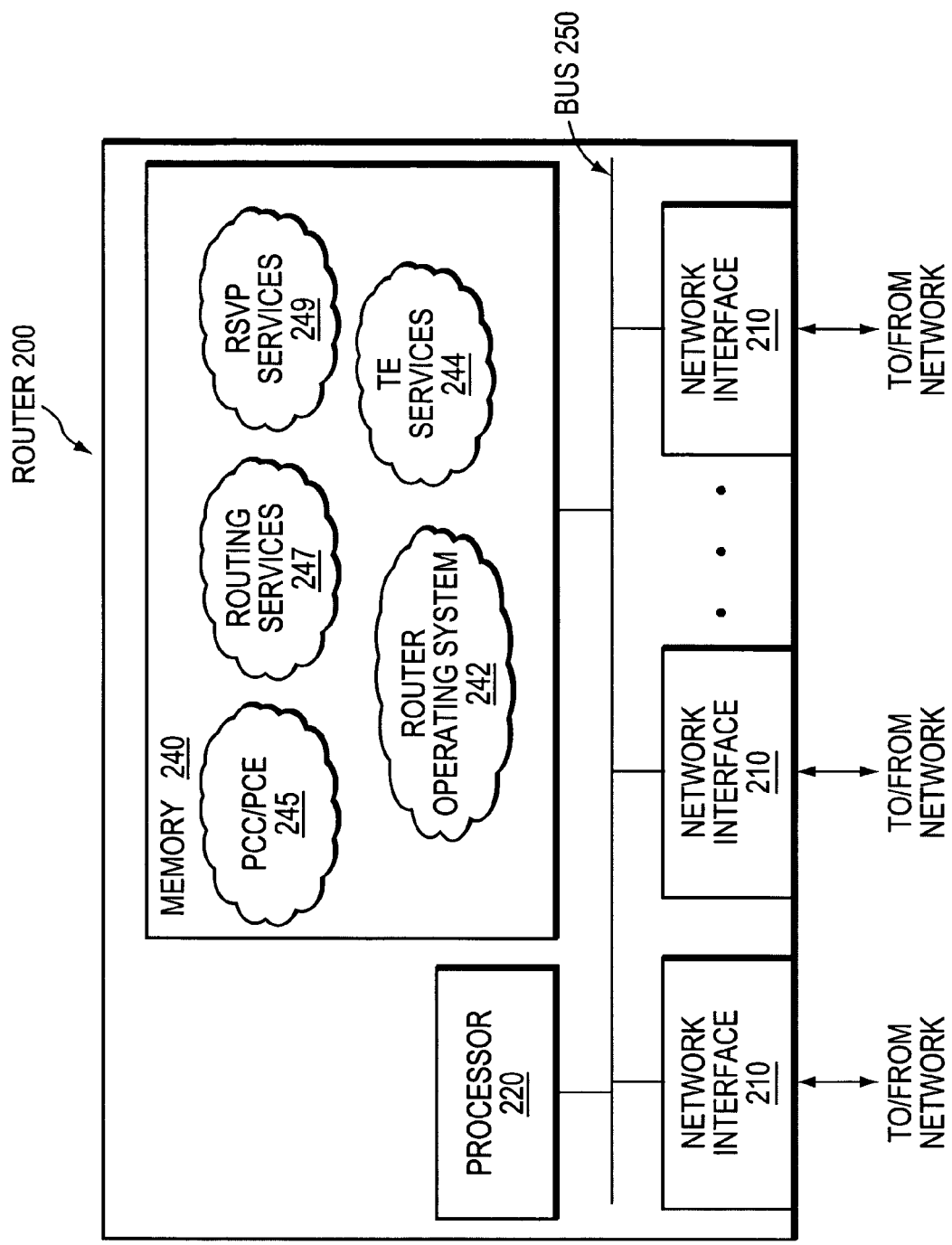
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. A router operating system 242, portions of which is typically resident in memory 240 and executed by the processor, functionally organizes the router by, inter alia, invoking network operations in support of software processes and/or services executing on the router. These software processes and/or services include PCC/PCE process 245, routing services 247, TE services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP and BGP. These functions may be configured to manage a forwarding information database (not shown) containing, e.g., data used to make forwarding decisions. TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering* (RSVP-TE) *Extensions* dated January 2003, which is hereby incorporated by reference in its entirety. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

Network reachability information may be communicated among routers 200 between the domains using BGP advertisements. Suppose, for example, that a new address prefix is established within an AS or a new connection is created between two or more ASes. Once the change in the network's state is detected by one of the BGP enabled routers, that router may transmit a BGP advertisement communicating the change to the other ASes.

Figure 3:
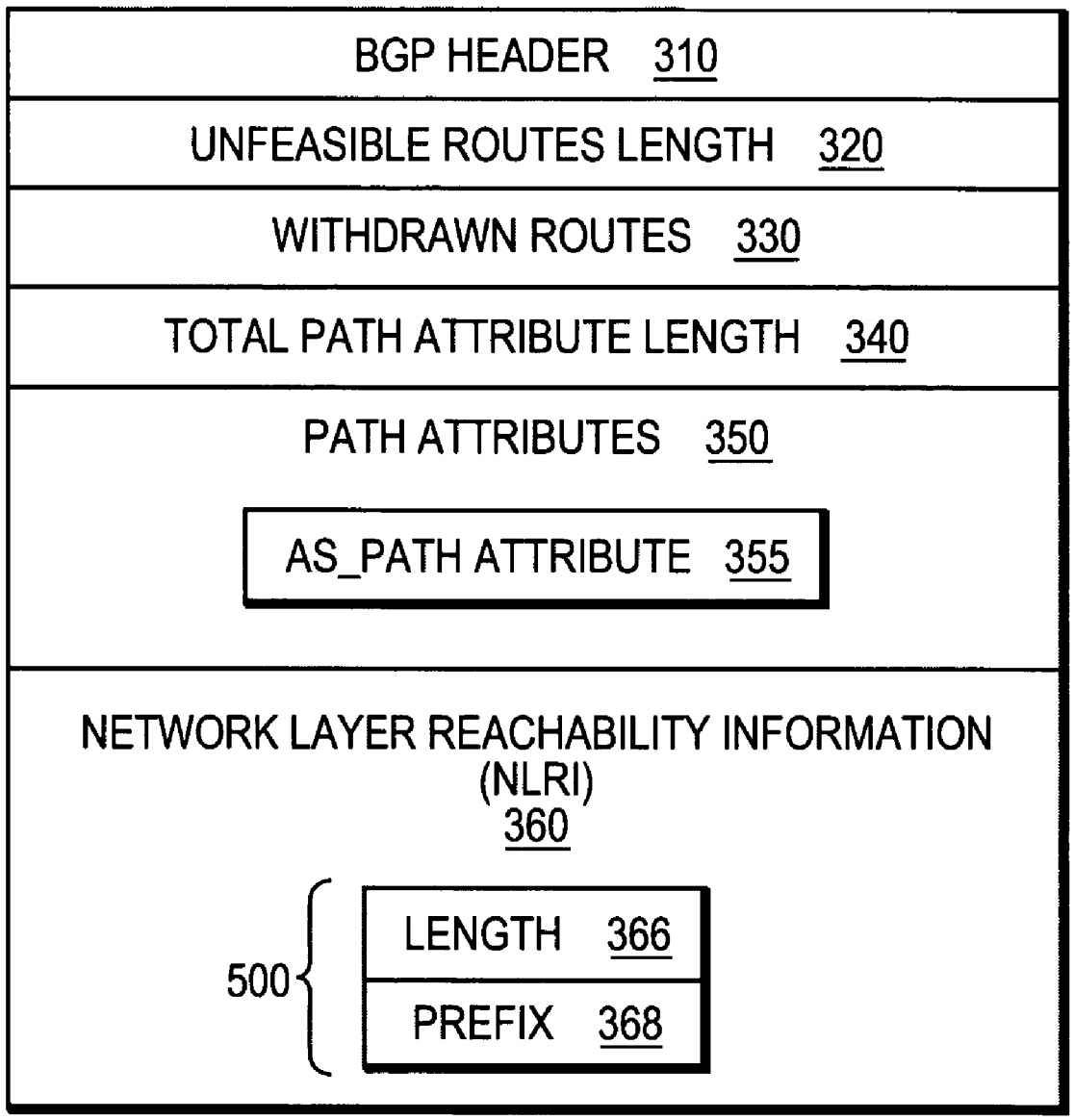
FIG. 3 is a schematic block diagram of an exemplary BGP Advertisement that may be transmitted by the routers.

FIG. 3 illustrates an exemplary BGP advertisement 300 that may be transmitted by BGP enabled routers 200. Illustratively, the BGP advertisement 300 is a BGP update message. The packet includes a BGP header 310, unfeasible routes length field 320, withdrawn routes 330, total path attribute length field 340, path attributes 350, and network layer reachability information (NLRI) 360. The BGP header 310 contains the type of BGP message (e.g., an update message), the overall length of the message, and other known information, such as predictable authentication data. The unfeasible routes length field 320 denotes the variable length of the withdrawn routes 330, which contain a list of routes that are no longer used (or advertised) by the advertising BGP node. Notably, if the update message 300 only advertises feasible routes, the withdrawn routes field 330 need not be present.

The total path attribute length field 340 indicates the variable length of the path attributes 350. Path attributes field 350 contain a sequence of optional path attributes with an attribute type, attribute length, and attribute value, such as, inter alia, an AS_PATH attribute 355. The AS_PATH attribute 355 is a well-known mandatory attribute that identifies the ASes through which routing information carried in the BGP update message 300 has passed (i.e., the domain route). The components of this attribute include path segments that may be configured as either an unordered set of ASes ("AS_SET") or an ordered sequence of ASes ("AS_SEQUENCE"). Each path segment is represented by a type (AS_SET or AS_SEQUENCE), a length (the number of ASes in the path segment), and a path segment field, containing one or more AS numbers (i.e., unique identifications of each AS), each AS number encoded as a two-octet (16-bit) number. Notably, as a BGP node from each AS receives the BGP update message 300, it prepends its own AS number to the AS_PATH attribute set or sequence prior to transmitting the message 300 to another AS (but not to other BGP nodes of the same AS), thus populating the AS_PATH attribute 355 with the appropriate values.

The Network Layer Reachability Information (NLRI) field 360 contains a list of address prefixes, whose length is calculated using the overall length of the BGP message 300 contained within the BGP header 310. Reachability information in the NLRI field 360 comprises one or more encoded entries 500 containing a length field 366, which signifies the length of a prefix field 368. The prefix field 368 contains the destination address prefixes that are reachable via the advertised domain route found in the AS_PATH attribute 355 of the BGP update message 300. Notably, a prefix 368 of zero length indicates a prefix that matches all destination addresses. A BGP update message 300 can advertise at most one route to a set of destination prefixes, and all path attributes 350 must apply to the whole set of destination prefixes contained in the NLRI field 360.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple domains, previously incorporated U.S. application Ser. No. 10/767,574 describes the use of a virtual shortest path tree (VSPT) algorithm in a distributed path computation element (PCE) architecture where multiple PCEs are involved in the computation of an inter-domain TE-LSP. Alternatively, a forward path computation technique (i.e., from the head-end node to the tail-end node) for an inter-domain TE-LSP in a distributed PCE architecture is described in commonly-owned copending U.S. patent application Ser. No. 11/049,587, entitled INTER-DOMAIN PATH COMPUTATION TECHNIQUE, filed by Vasseur et al., on Feb. 2, 2005, the contents of which are hereby incorporated by reference in its entirety. Notably, it will be apparent to those skilled in the art that other methods may be used to compute the TE-LSPs (e.g., loose hops, explicit paths, etc.), and such methods are within the scope of the present invention.

As an example, assume that all shown border routers in FIG. 1 (ASBR1-2) are PCE enabled border routers. The address of the local PCE may be manually configured. Alternatively, the PCE may advertise itself through flooding within the domain using, e.g., path computation element discovery (PCED) techniques in accordance with *OSPF MPLS Traffic Engineering Capabilities (draft-vasseur-ospf-te-caps.txt)* by Vasseur, et al., published July 2004, which is hereby incorporated by reference. A PCED message may include, inter alia, the address of the PCE, and indications of PCE capabilities, such as the ability to compute local paths, inter-area paths, inter-AS paths, multi-domain paths, diverse paths, etc. Knowledge of other PCE addresses may be acquired by way of static configuration or other means as could be readily devised by one of skill in the art. Notably, where multiple PCEs exist in a domain, a technique for selecting a PCE to use is described in commonly-owned copending U.S. patent application Ser. No. 10/983,280, entitled TECHNIQUE FOR SELECTING A PATH COMPUTATION ELEMENT, filed by Vasseur et al., on Nov. 5, 2004, the contents of which are hereby incorporated by reference in its entirety.

The path computation request (and response) between PCC and PCE can be exchanged in accordance with a protocol specified in Vasseur, et al. *RSVP Path Computation Request and Reply Messages<draft-vasseur-mpls-computa-*

Figure 4:
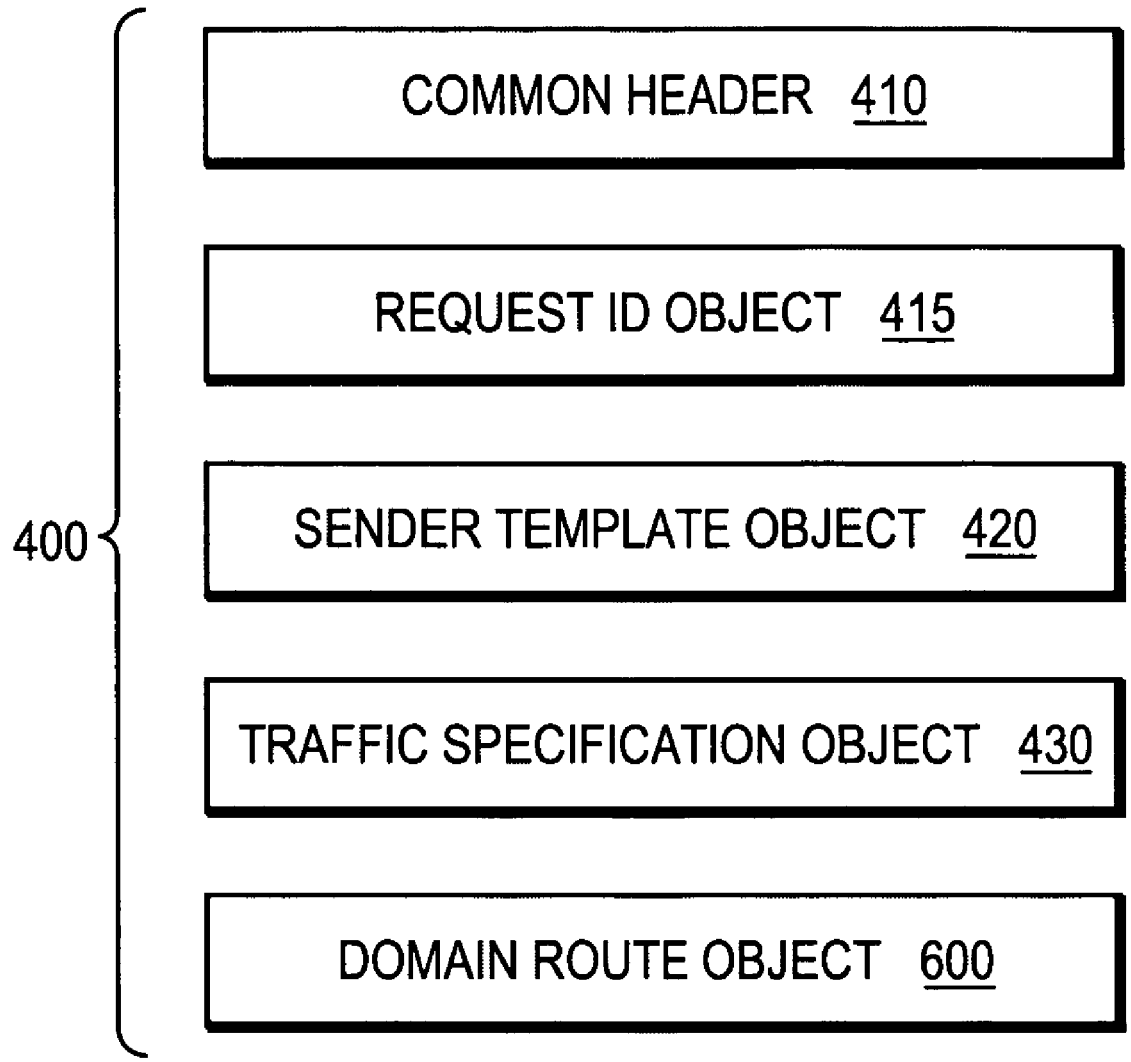
FIG. 4 is a schematic block diagram of portions of an RSVP path computation request that may be advantageously used with the present invention.

*tion-rsvp*-05. *txt*>, Internet Draft, July 2004, which is hereby incorporated by reference as though fully set forth herein. In accordance with RSVP, to request a TE-LSP (data flow) from a head-end node to a tail-end node, the head-end node (a PCC) may send a path computation request to a local PCE. The path computation request may contain various information about the requested data flow including, e.g., traffic characteristics of the data flow. FIG. 4 is a schematic block diagram of portions of an RSVP path computation request 400 that may be advantageously used with the present invention. Message 400 contains, inter alia, a Common Header 410, a Request ID object 415, a Sender Template object 420, and a Traffic Specification (Tspec) object 430. It should be noted that message 400 may contain other objects including a novel Domain Route object 600 (described further below). It should be understood that the use of RSVP serves only as an example, and that other communication protocols may be used in accordance with the present invention.

The present invention is directed to a technique for calculating a shortest path for a traffic engineering (TE) label switched path (LSP) from a head-end node in a local domain to a tail-end node of a remote domain in a computer network. The novel path calculation technique determines a set of different remote domains through which the TE-LSP may traverse to reach the tail-end node (e.g., along "domain routes"). Once the set of possible routes is determined, the head-end node sends a path computation request to one or more path computation elements (PCEs) of its local domain requesting a computed path for each domain route. Upon receiving path responses for each possible domain route, the head-end node selects the optimal (shortest) path, and establishes the TE-LSP accordingly.

In the illustrative embodiment described herein, the domain routes are determined using extensions to Border Gateway Protocol (BGP) messages. BGP nodes of the remote domains propagate ("advertise") domain routes to various prefixes, e.g., to the prefix containing the tail-end node, by means of BGP messages ("BGP advertisements") 300 transmitted across domains to a local BGP node. The extensions allow the BGP advertisements to advertise all possible domain routes, in addition to the best domain route advertised by the advertising BGP node.

Figure 5:
FIG. 5 is an illustrative NLRI entry that may be used to transmit possible domain routes in accordance with the present invention.

FIG. 5 is an illustrative NLRI entry 500 that may be used to transmit possible domain routes in accordance with the present invention. The extensions to the NLRI entry 500 (as originally shown in FIG. 3) still include a length field 566 and prefix field 568 as described above. In addition, extensions include a flags field 562, and an identifier field 564. Flags field 562 contains indications of whether the current BGP advertisement 300 contains a domain route (AS_PATH 355) for the best path (e.g., the path BGP would select to advertise), the first path transmitted (so receiving BGP nodes know to expect more possible domain routes), the last path transmitted (so receiving BGP nodes know not to expect more possible domain routes), etc. Also, the identifier field 564 contains a unique identification of each path, so the receiving nodes may distinguish between the paths. Notably, because each BGP advertisement 300 only contains one possible domain route in AS_PATH attribute 355, separate BGP advertisements contain each of the possible domain routes. Extensions to the NLRI entry 500 and their uses to advertise multiple paths in BGP are further described in *Advertisement of Multiple Paths in BGP* <*draft-walton-bgp-add-paths*-01.*txt*>, by Walton, et al., published November 2002, the contents of which are hereby incorporated by reference in its entirety. Those skilled in the art will understand that other techniques may be used to transmit multiple domain routes to a prefix, and that such techniques are within the scope of the present invention. The extensions defined above are merely examples.

Referring to FIG. 1, the head-end node (node A) receives BGP advertisements 300 (e.g., from ASBR1 and ASBR2) that advertise domain routes to the address prefixes within AS5, which contains the tail-end node (node B). The "best path" according to BGP (i.e., the smallest number of domains) is the domain route from AS1 to AS4 to AS5, denoted herein as domain route {1, 4, 5}. Illustratively, the remaining advertised domain routes for network 100 from AS1 to AS5 are: {1, 2, 3, 5}; {1, 2, 4, 5}; {1, 2, 3, 4, 5}; {1, 2,4,3,5}; {1,4,2,3,5}; and {1,4,3,5}.

In accordance with one aspect of the present invention, the head-end node receives the BGP advertisements containing the possible domain routes, and determines the set of domain routes that lead to the tail-end node (e.g., to the prefix of the tail-end node). The head-end node (node A) may be configured as a BGP enabled node. As such, the head-end node may receive the BGP advertisements 300 directly from another domain (e.g., AS2) as an eBGP message, or instead may receive the advertisement from another BGP enabled node within its domain (AS1), such as from ASBR1, through an iBGP message.

Notably, the head-end node may exclude domain routes based on policy, and may also exclude domain routes if they are a superset of other domain routes (i.e., include all the domains of some other domain route, in addition to one or more other domains). For example, again referring to the possible domain routes of FIG. 1, assuming that no policy-based exclusions apply (as will be understood by those skilled in the art), all possible domain routes remain. However, it may be desirable to further exclude any supersets from the list of possible domain routes to avoid excessive path computation traffic. For instance, because the domain route {1, 4, 5} is the shortest domain route (i.e., has the least number of domains), any domain route that traverses the domains 1, 4, 5, and others can be assumed to be a longer domain route. In this manner, the domain routes of: {1, 2, 4, 5}; {1, 2, 3, 4, 5}; {1, 2, 4, 3, 5}; {1, 4, 2, 3, 5}; and {1, 4, 3, 5} all contain domains 1, 4, and 5, and hence are supersets (notably, of the subset {1, 4, 5}) and may be excluded. Remaining domain routes then include {1, 4, 5} and {1, 2, 3, 5}. Notably, those skilled in the art will understand that supersets may have been excluded by previous domains in the same manner, and that the head-end node may only receive a portion of the supersets (if any) of domain routes that lead to the tail-end node.

The head-end node generates a path computation request for each of the remaining domain routes, and sends the requests to the appropriate PCE (i.e., a PCE that handles requests for the particular domain route). For instance, again assuming that ASBR1 and ASBR2 are PCE enabled nodes, ASBR1 may be more suited to receive a path computation request over a domain route that begins with AS2, while ASBR2 may be more suited for path computation requests for domain routes that begin with AS4. As mentioned above, techniques for selecting a PCE are further described in above-referenced U.S. patent application Ser. No. 10/983,280.

Figure 6:
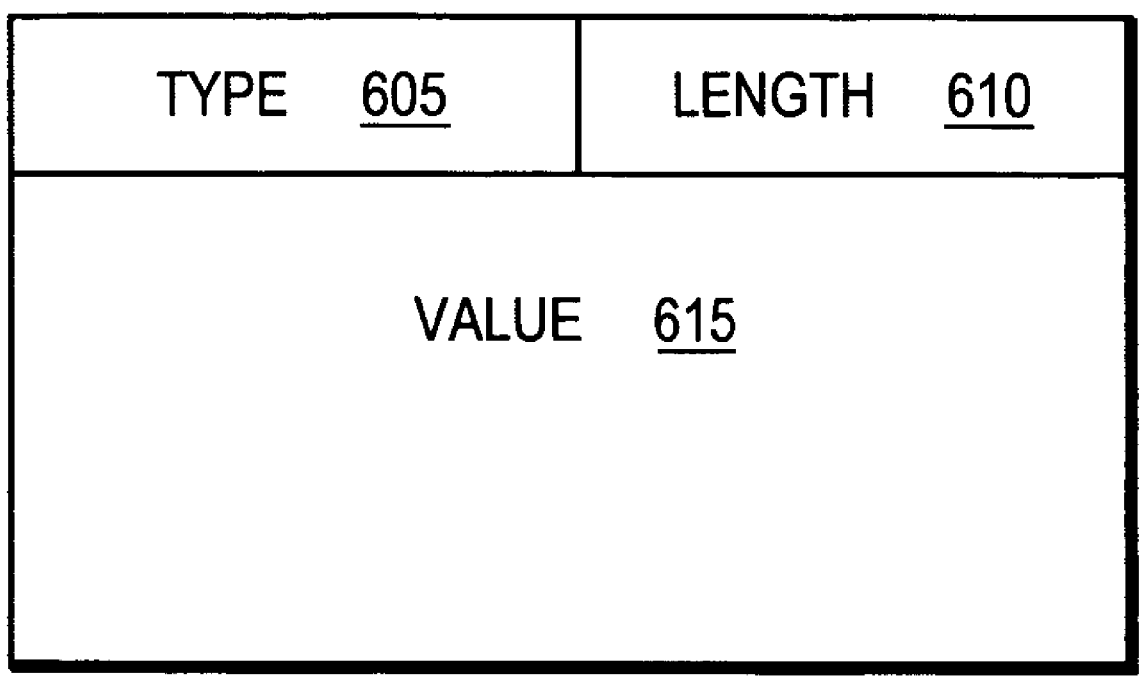
FIG. 6 is a schematic block diagram illustrating a Domain Route object that may be advantageously used with the present invention.

In the illustrative embodiment described herein, the path computation requests are transmitted in accordance with RSVP TE signaling messages, such as path computation request 400. The head-end node inserts the domain route information into the path computation request 400, as discovered by the BGP advertisements 300, and transmits the request to the appropriate PCE. Notably, the path computation requests 400 include type/length/value (TLV) encoded formats used to convey the domain route information. such as Domain Route object 600. FIG. 6 is a schematic block diagram illustrating a Domain Route object 600 encoded using a TLV that may be advantageously used with the present invention. The TLV encoding format is a general way to communicate information between nodes, such as routers. The TLV "attribute" 600 is used to identify a type (T) of information being communicated (conveyed), a length (L) of information to be conveyed and a value (V) of the actual information conveyed. The length (L) parameter contained in the length field 610 is typically implementation-specific and can denote the length from the beginning of the Type field 605 of the attribute 600 to the end. However, the length generally denotes the length of the Value (V) field 615 and not the Type (T) or Length (L) fields. Specifically, in accordance with the present invention, Value field 615 encodes the ordered list of domains (ASes) in the desired domain route (e.g., {1, 4, 5} and {1, 2, 3, 5}). Those skilled in the art will not only understand that the ordered list may take a similar format to the AS_PATH attribute 355, but also that other formats and configurations may be used within the scope of the present invention.

The PCE(s) then computes a shortest path for each domain route based on the information in the request, regardless of the domain route typically used for path computation by the PCE. As described above, the path computation request 400 contains an ordered list of domains to thereby "force" the route of the path computation. When a PCE receives the request 400, it examines the contents of the Domain Route object 600 and determines to which domain the path computation request 400 is to be sent next. In this way, each path computation request 400 traverses the appropriate domain route to the tail-end node, such that the domain route selected for use by BGP is but one of a possible plurality of choices. Methods for calculating paths across multiple ASes are known to those skilled in that art, and described further in above-referenced U.S. application Ser. Nos. 10/767,574 and 11/049,587.

In accordance with another aspect of the present invention, the head-end node receives responses to the path computation requests (i.e., path computation replies), where each response contains the shortest path for the corresponding domain route, e.g., based on some metric, or "cost." Each received path for the domain routes and their respective cost values are stored in memory 240 of the head-end node until all responses have been received. The head-end node then selects the shortest path to the tail-end node, and establishes the TE-LSP accordingly. Illustratively, the head-end node establishes the TE-LSP using RSVP TE signaling messages, known to those skilled in the art and described herein.

Notably, the head-end node may be configured to receive responses for a period of time before selecting the shortest path. In some circumstances there may be a large number of domain routes, or various connections within the network may be down (not functioning) or congested (slower due to a high volume of traffic). To account for this, a configurable timer may be used by the head-end node, in which only those responses received prior to expiration of the timer will be considered when selecting the shortest path. For example, if there are ten domain routes, the head-end sends out ten path computation requests. Assume that when the timer expires, only eight responses have returned to the head-end node. In this case, the head-end node selects the shortest path based on those eight responses. Moreover, any responses received after expiration of the timer may either be considered invalid or compared against the selected path to determine if the newly received response is a shorter path (e.g., by some configurable amount). Also, paths resulting from other domain routes that are not selected (either before or after the expiration of a timer) may be stored for use as backup paths or other uses. For instance, the nonselected paths may be stored in memory 240 for backup paths (such as for MPLS TE Fast Reroute), load balancing, or other uses of multiple paths known to those skilled in the art.

Re-optimization of the TE-LSP may be configured to re-optimize along the established path and any non-selected paths. Re-optimization can be timer based (e.g., every minute, hour, week, etc.), or event based (e.g., a restored or added link). Techniques and triggers for re-optimization are known to those skilled in the art, and such techniques, may be used in accordance with the present invention. Namely, upon reoptimizing the TE-LSP and sending path computation requests along each domain route, the head-end node again selects the shortest returned path in accordance with the methods described herein.

Figure 7:
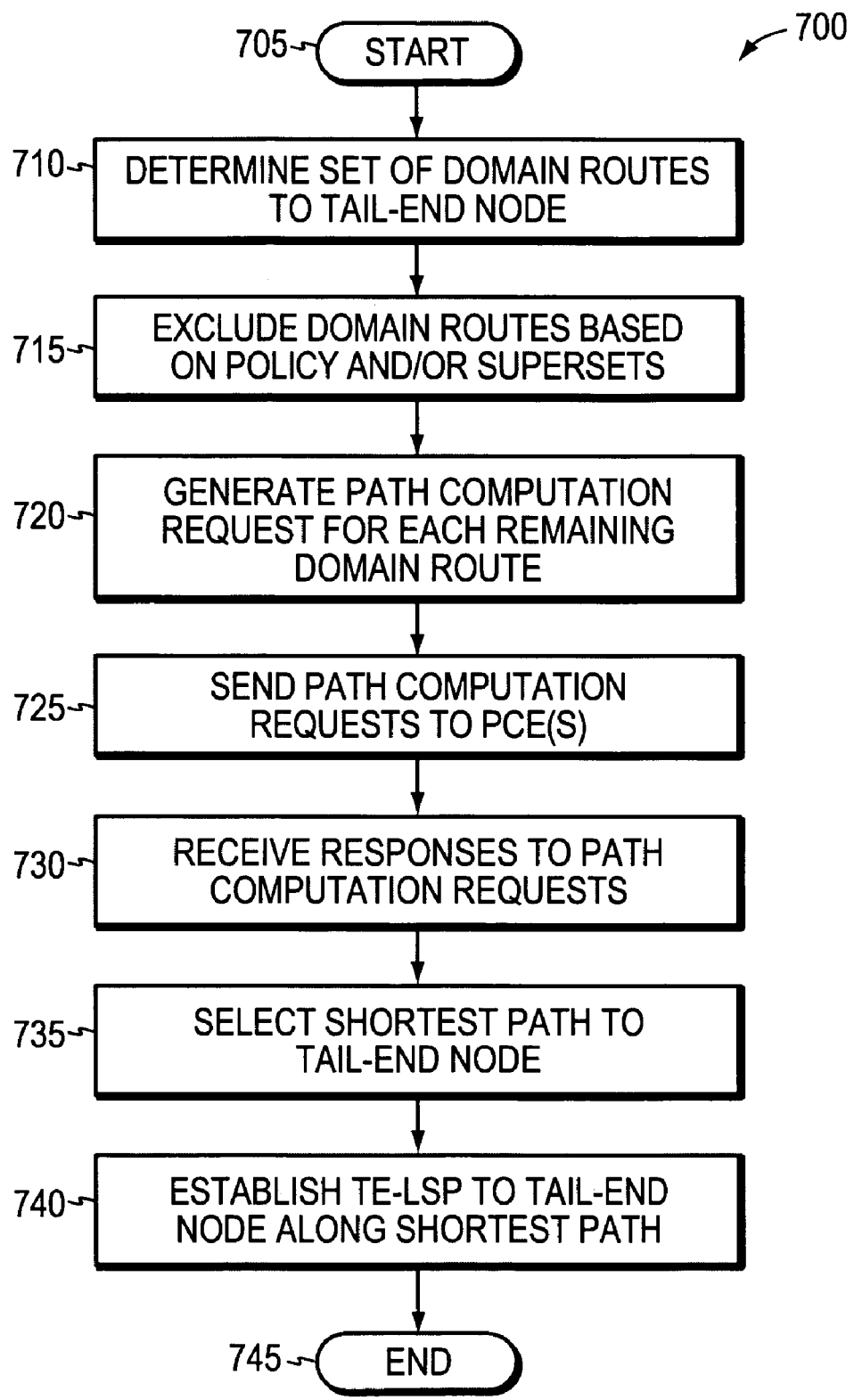
FIG. 7 is a flowchart illustrating a sequence of steps for calculating the shortest inter-domain path in accordance with the present invention.

FIG. 7 is a flowchart illustrating a sequence of steps for calculating the shortest inter-domain path in accordance with the present invention. Sequence 700 starts at step 705 and continues to step 710 where the head-end node (node A) determines the set of domain routes to the tail-end node (node B). At step 715, the head-end node may exclude any domain routes based on local policy, and further may exclude any domain routes that are supersets of other domain routes, as described above. Once a set of remaining domain routes exist, the head-end node generates a path computation request 400 for each of the remaining domain routes in step 720. At step 725, the path computation requests 400 are sent to the appropriate PCE(s) (ASBR1) for path computation in accordance with the domain route located in the Domain Route object 600 in the request. The PCE(s) perform conventional path computation to the tail-end node based on the specified domain route, and return responses to the head-end node for each domain route, and at step 730, the head-end node receives the responses to the path computation requests. Notably, the head-end node may receive a response to all path computation requests, or it may instead employ a timer as described above. Upon receiving the responses, the head-end node selects the shortest path to the tail-end node at step 735, e.g., as based on some metric (cost), and at step 740, the head-end node establishes a TE-LSP to the tail-end node along the selected shortest path in accordance with conventional methods known to those skilled in the art. The sequence ends at step 745.

Advantageously, the novel technique calculates a shortest path for a TE-LSP from a head-end node in a local domain to a tail-end node of a remote domain in a computer network. By determining the set of domain routes to the tail-end node, the inventive technique provides an efficient mechanism for generating path computation requests for each possible domain route, and selecting the shortest path contained in responses to the request. In particular, the invention provides the shortest path through a selection of multiple domain routes, not just through the domain route typically used for path computation, which may or may not be the optimal route.

While there has been shown and described an illustrative embodiment that calculates a shortest path for a TE-LSP from a head-end node in a local domain to a tail-end node of a remote domain, it is to be understood that various other adaptations and modifications may be made within the spirit and scope of the present invention. For example, while the above description describes performing the technique at the head-end node, the invention may also be advantageously used with PCEs. Notably, the invention has been shown and described herein using BGP messages and extensions to BGP to transmit the possible domain routes to BGP enabled nodes. However, the invention in its broader sense is not so limited, and may, in fact, be used with IGP nodes. For instance, the possible domain routes may be contained within known extensions to IGP messages. Also, those skilled in the art will understand that various measures may be taken to account for certain scalability concerns of multiple domain routes being propagated throughout the network, and the number of domain routes for which to generate path computation requests. Such measures include, inter alia, the use of access lists, communities, or limiting the transmission of multiple domain routes to a selected number of tail-end node prefixes, such as loop-back addresses of certain routers.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for calculating a particular path for a traffic engineering label switched path (TE-LSP) from a head-end node in a local domain to a tail-end node of a remote domain in a computer network, the method comprising:
   determining a plurality of different domain routes to the tail-end node, each domain route indicating one or more other remote domains through which the TE-LSP may traverse to reach the tail-end node of the remote domain;
   generating a plurality of different path computation requests, each path computation request including a different domain route of the plurality of domain routes and requesting a computed path along the included domain route;
   sending the plurality of different path computation requests to one or more path computation elements (PCEs) of the local domain;
   receiving one or more path responses to the path computation request for each different domain route;
   selecting the particular path from the path responses; and
   establishing the TE-LSP along the particular path.

2. The method as in claim 1, wherein the particular path is the shortest path.

3. The method as in claim 1, wherein the step of determining further comprises:
   learning the domain routes from border gateway protocol (BGP) advertisements.

4. The method as in claim 3, wherein the domain routes are contained within extensions to the BGP advertisements.

5. The method as in claim 1, further comprising:
   excluding one or more domain routes from the selecting based on policy.

6. The method as in claim 1, further comprising:
   excluding one or more domain routes from the step of selecting if they are a superset of other domain routes.

7. The method as in claim 1, further comprising:
   initiating a timer, wherein the step of selecting is performed after expiration of the timer.

8. The method as in claim 1, further comprising:
   using paths other than the particular path as backup paths.

9. A system for calculating a particular path for a traffic engineering label switched path (TE-LSP) from a local domain to a tail-end node of a remote domain in a computer network, the system comprising:
   a border gateway protocol (BGP) node to receive and advertise a plurality of different domain routes to the tail-end node, each domain route indicating one or more other remote domains through which the TE-LSP may traverse to reach the tail-end node of the remote domain;
   one or more path computation elements (PCEs) to receive path computation requests; and
   a head-end node to i) determine the plurality of different domain routes to the tail-end node, ii) generate a plurality of different path computation requests, each path computation request to include a different domain route of the plurality of domain routes and to request a computed path along the included domain route, iii) send the plurality of different path computation requests to the one or more PCEs of the local domain, iv) receive one or more path responses to the path computation request for each different domain route, and v) select a particular path from the path responses.

10. The system as in claim 9, wherein the particular path is the shortest path.

11. The system as in claim 9, further comprising:
    the TE-LSP established along the particular path.

12. The system as in claim 9, further comprising:
    BGP advertisements to advertise the set of domain routes to the tail-end node.

13. The system as in claim 12, further comprising:
    extensions to the BGP advertisements to contain the domain routes.

14. The system as in claim 9, wherein the head-end node is further to exclude one or more domain routes from selection based on policy.

15. The system as in claim 9, wherein the head-end node is further to exclude one or more domain routes from selection if they are a superset of other domain routes.

16. The system as in claim 9, further comprising:
    a timer, wherein the selection of the particular path is performed after expiration of the timer.

17. The system as in claim 9, further comprising:
    a memory in the head-end node to store paths other than the particular path as backup paths.

18. An apparatus for calculating a particular path for a traffic engineering label switched path (TE-LSP) from a head-end node in a local domain to a tail-end node of a remote domain in a computer network, the apparatus comprising:
    means for determining a plurality of different domain routes to the tail-end node, each domain route indicating one or more other remote domains through which a TE-LSP may traverse to reach the tail-end node of the remote domain;
    means for generating a plurality of different path computation requests, each path computation request including a different domain route of the plurality of domain routes and requesting a computed path along the included domain route;
    means for sending the plurality of different path computation requests to one or more path computation elements (PCEs) of the local domain;
    means for receiving one or more path responses to the path computation request for each different domain route;
    means for selecting the particular path from the path responses; and means for establishing the TE-LSP along the particular path.

19. A node for calculating a particular path for a traffic engineering label switched path (TE-LSP) from a local domain to a tail-end node of a remote domain in a computer network, the node comprising:

a network interface to receive and send advertisements of a plurality of different domain routes to the tail-end node, each domain route indicating one or more other remote domains through which the TE-LSP may traverse to reach the tail-end node of the remote domain, the network interface further to send a plurality of different path computation requests to one or more path computation elements (PCEs) of the local domain and receive one or more path responses from the PCEs;

a processor coupled to the network interface and to execute software processes; and a memory to store a head-end node process executable by the processor, the head-end node process configured to i) generate the plurality of different path computation requests, each path computation request including a different domain route of the plurality of domain routes and requesting a computed path along the included domain route, ii) receive the one or more path responses and iii) select the particular path from the one or more path responses.

20. A method comprising:

using a border gateway protocol (BGP) to determining a plurality of different domain routes from a local domain of a head end node to a remote domain of a tail-end node, each of the different domain routes indicating one or more domains that may be traversed to reach the remote domain of the tail-end node, the plurality of domain routes including a best domain route determined based on the value of one or more attributes and one or more other domain routes;

sending one or more path computation requests to one or more path computation elements (PCEs), the one or more path computation requests requesting computation of a traffic engineering label switched path (TE-LSP) from the head-end node to the tail-end node along each of the different domain routes of the plurality of different domain routes;

receiving one or more path responses to the one or more path computation requests, the one or more path response including computed paths that include at least a computed path along the best domain route and a computed path along one of the one or more other domain routes;

selecting the computed path along the one of the one or more other domain routes rather than the computed path along the best domain route; and establishing the TE-LSP along the selected computed path.

21. The method as in claim 20, wherein the selected path along the one of the one or more other domain routes is shorter than the path along the best domain route.

22. The method as in claim 20, wherein using further comprises:

learning the plurality of different domain routes from border gateway protocol (BGP) advertisements.

23. The method as in claim 22, wherein at least some of the plurality of different domain routes are contained within extensions to the BGP advertisements.

24. The method as in claim 20, further comprising:

excluding one or more domain routes from the selecting based on policy.

25. The method as in claim 20, further comprising:

excluding one or more domain routes from the selecting if they are a superset of other domain routes.

26. The method as in claim 20, further comprising:

using one or more computed paths other than the selected computed path as backup paths for the TE-LSP.

27. An apparatus comprising:

a network interface to receive advertisements of a plurality of different domain routes from a local domain to a remote domain of a tail-end node, each of the different domain routes indicating one or more domains that may be traversed to reach the remote domain of the tail-end node, the plurality of domain routes including a best domain route determined based on the value of one or more attributes and one or more other domain routes, the network interface further to send one or more path computation requests to one or more path computation elements (PCEs) and to receive one or more path responses from the one or more PCEs;

a processor coupled to the network interface and to execute software processes; and a memory to store a head-end node process executable by the processor, the head-end node process when executed to i) generate the one or more path computation requests to request computation of a traffic engineering label switched path (TE-LSP) from the head-end node to the tail-end node along each of the different domain routes of the plurality of different domain routes, ii) process the one or more path responses and obtain therefrom computed paths including at least a computed path along the best domain route and a computed path along one of the one or more other domain routes, iii) select the computed path along the one of the one or more other domain routes rather than the computed path along the best domain route; and establish the TE-LSP along the selected computed path.

28. The apparatus as in claim 27, wherein the selected path along the one of the one or more other domain routes is shorter than the path along the best domain route.

29. The apparatus as in claim 27, wherein at least some of the plurality of different domain routes are contained within extensions to the BGP advertisements.

30. The apparatus as in claim 27, wherein the head-end node process when executed further excludes one or more domain routes from selection based on policy.

31. The apparatus as in claim 27, wherein the head-end node process when executed further excludes one or more domain routes from selection if they are a superset of other domain routes.

32. The apparatus as in claim 27, wherein the head-end node process when executed further uses one or more computed paths other than the selected computed path as backup paths for the TE-LSP.

* * * * *